April 9, 1957　　H. O. SCHJOLIN ET AL　　2,788,091
WHEEL BRAKE HAVING MULTIPLE FORCE APPLYING WEBS
Filed April 5, 1954　　3 Sheets-Sheet 1

INVENTOR.
HANS O. SCHJOLIN
DONALD K. ISBELL
Craig V. Montow
ATTORNEY

April 9, 1957    H. O. SCHJOLIN ET AL    2,788,091
WHEEL BRAKE HAVING MULTIPLE FORCE APPLYING WEBS
Filed April 5, 1954    3 Sheets-Sheet 2

INVENTOR.
HANS O. SCHJOLIN
BY DONALD K. ISBELL
Craig V. Morton
ATTORNEY

April 9, 1957 H. O. SCHJOLIN ET AL 2,788,091
WHEEL BRAKE HAVING MULTIPLE FORCE APPLYING WEBS
Filed April 5, 1954 3 Sheets-Sheet 3

INVENTOR.
HANS O. SCHJOLIN
BY DONALD K. ISBELL
Craig V Morton
ATTORNEY

United States Patent Office 2,788,091
Patented Apr. 9, 1957

2,788,091

WHEEL BRAKE HAVING MULTIPLE FORCE APPLYING WEBS

Hans O. Schjolin, Birmingham, and Donald K. Isbell, Pontiac, Mich., assignors to General Motors Corporation, Detroit, Mich., a corporation of Delaware Application April 5, 1954, Serial No. 421,008

14 Claims. (Cl. 188—79)

This invention relates to brake structures particularly adapted for use on motor vehicles.

It is well recognized that the brake shoes used in the brakes for automotive vehicles are not absolutely rigid structures. Conventionally, the brake shoes are constructed of an arcuate metal sheet that has a sheet metal web bonded to the interior side of the rim of the shoe through which brake force is applied to the shoe. One end of the web normally engages an anchor pin while a force applying means is connected with the web to apply the desired brake force to the shoe through the web.

Such a structure is not an absolutely rigid structure since the sheet metal rim does have some degree of transverse flexibility when force is applied radially to the rim through the web. In brake shoes of relatively narrow width, the degree of transverse flexibility in the shoe rim does not offer too many disadvantages so that this inherent transverse flexibility of the sheet metal type of rim has been used in conventional practice in the major production of automotive manufacturers.

However, when brakes are used on large automotive vehicles, such as heavy trucks, busses and the like, it is obvious that the size of the brake shoe is greatly increased over that normally required for the average passenger car. Hence, there has been a determined effort on the part of manufacturers of heavy automotive equipment to make serious efforts to effect extreme rigidity in the brake shoes to substantially eliminate any transverse deflection of the shoe when a brake force is applied to the shoe. However, such efforts have greatly increased the weight of the brake shoes, as well as their cost so that this path of development is largely disadvantageous.

It is therefore an object of this invention to provide a brake with a brake shoe construction that can take advantage of the normal transverse flexibility of a sheet metal brake shoe to secure a more uniform application of brake load over the entire area of the lining carried by the brake shoe. This result is secured by constructing the brake shoe in a manner that more uniform conformability of the shoe to the shape of the brake drum can be obtained with the inherent flexibility of the brake shoe being taken advantage of to provide a varying deformation of the brake shoe in accordance with any deformation of the brake drum that results from high loading and high heating.

It is therefore an object of this invention to provide a brake with a brake shoe construction wherein the brake shoe is non-rigid transversely of the shoe and is provided with a series of webs distributed across the shoe with each web having its own independent area of influence to effect conformability of the brake shoe to the brake drum and thereby secure a more uniform distribution of the brake load over the surface of the brake shoe.

It is another object of the invention to provide a brake with a brake shoe that is non-rigid transversely of the shoe with a series of force applying webs distributed on the shoe in a manner that each web has an equal area of influence on the shoe with each of the webs acting independently but simultaneously on the shoe to cause it to conform to the shape of the brake drum and thereby secure a more uniform brake load distribution over the surface of the shoe.

Further objects and advantages of the present invention will be apparent from the following description, reference being had to the accompanying drawings wherein a preferred form of the invention is clearly shown.

Figure 1:
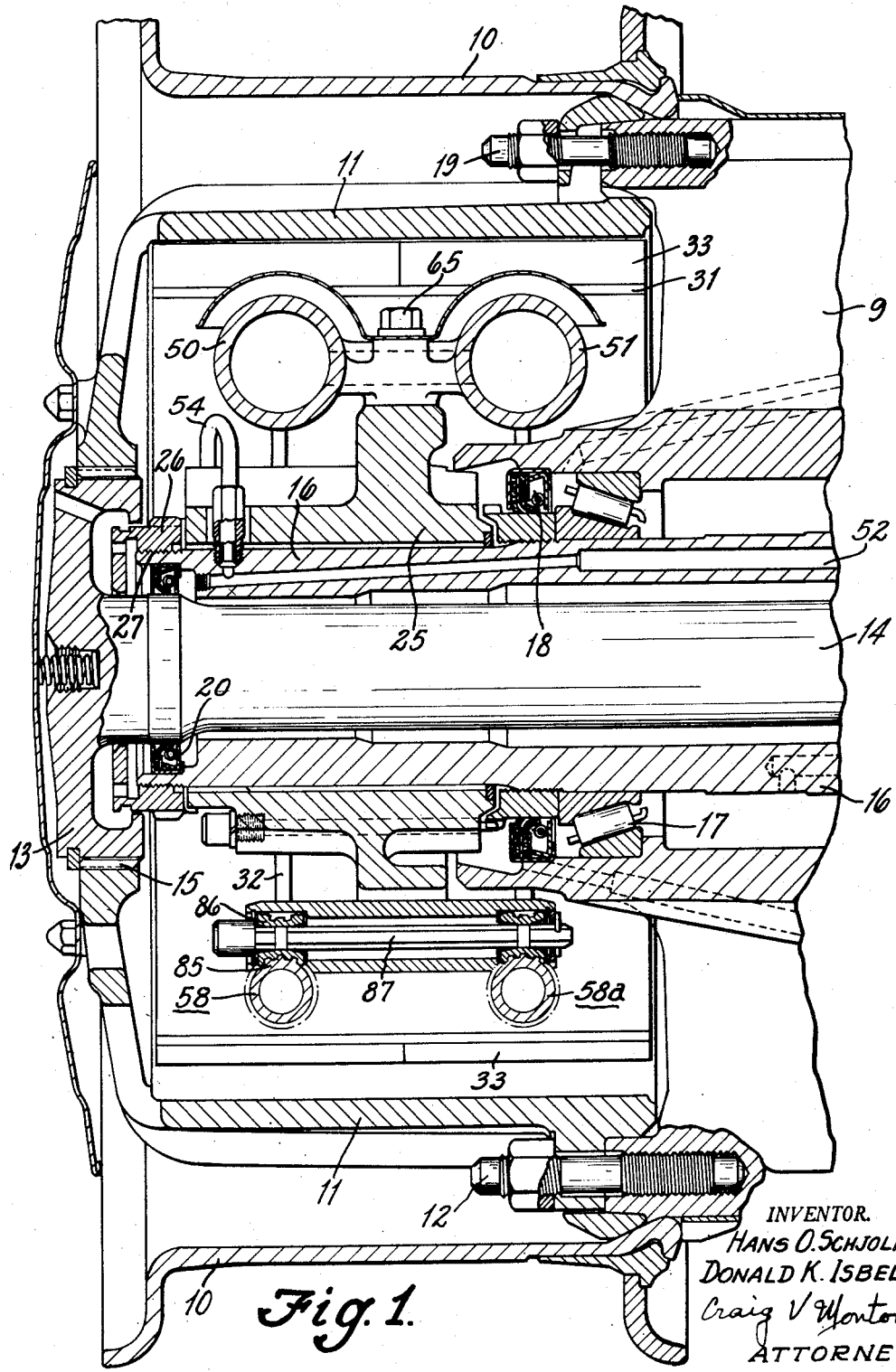
Figure 1 is a longitudinal cross section through a vehicle wheel incorporating a brake having features of this invention contained therein and is taken substantially along line 1—1 of Figure 2.

The brake structure of this invention is illustrated as applied to the rear wheel of a motor vehicle. The wheel 9 carries a brake drum 11 that is attached to the wheel 9 by means of a plurality of studs 12 positioned equidistantly about the wheel 9. The wheel 9 is carried upon the axle housing 16 by means of anti-friction bearings 17, a suitable grease seal 18 being provided between the bearing 17 and the outboard side of the wheel. The wheel rim 10 is carried upon the wheel 9 and is secured thereto by a series of studs 19 positioned equidistantly about the periphery of the wheel.

The brake drum 11 is connected with the axle shaft 14 that extends through the axle housing 16, the drum 11 being attached to the enlarged head 13 by means of a splined connection 15. A suitable grease seal 20 is provided between the axle 14 and the axle housing 16.

A brake spider 25 is supported upon the axle housing 16 and is retained in position thereon by means of a threaded member 26 that is in threaded connection with the end of the axle housing 16, the threads 27 providing the desired connection between the housing 16 and the member 26. The brake spider 25 is of course splined to the axle housing 16 to prevent relative rotation therebetween.

The brake spider 25 carries a pair of brake shoes 30 and 30a. Each of the brake shoes 30 and 30a comprise an arcuate sheet metal rim 31 that supports blocks of friction lining 33. The sheet metal from which the rim 31 is constructed is of relatively uniform thickness and is selected for permitting a small degree of transverse flexibility in the rim.

Each of the rims 31 is provided with a plurality of force applying webs 32 that also are made of sheet metal of substantially uniform thickness. The webs 32 are positioned substantially normal to the interior side of the rim and are bonded to the rim by a suitable process, such as welding. Thus, the brake shoe is a fabricated part of sheet material.

Each of the webs 32 is positioned substantially midway between the longitudinal center line of the rim 31 and an edge of the rim. Thus, the rim 31 is divided longitudinally into areas of influence each containing a web 32 running longitudinally of the area of influence and positioned substantially midway between opposite edges of the area of influence.

Figures 4, 5:
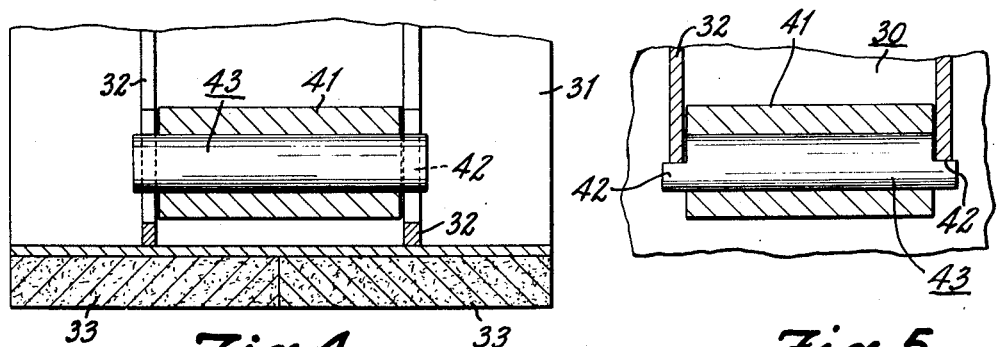
Figure 4 is a cross sectional view taken along line 4—4 of Figure 2.
Figure 5 is a cross sectional view taken along line 5—5 of Figure 2.
Figure 6:
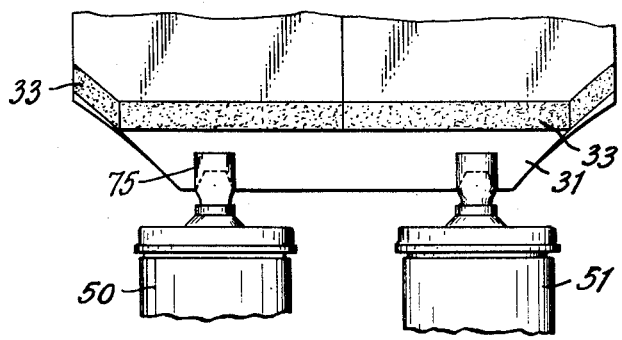
Figure 6 is a view taken in the direction indicated by arrow 6 in Figure 2.

The brake shoes 30 and 30a are positioned on the spider 25 with the webs 32 disposed at opposite sides of a centering pad 40 projecting from the spider 25 and of the centering pad 41 that also projects from the spider 25. Each of the centering pads 41 have an anchor pin 43 extending through the same that is independently engaged by each of the webs 32 of the brake shoes, as shown in Figure 4.

The anchor pin 43 has the ends thereof cut away to form a half-circular segment 42, the cord of which is on the diameter of the anchor pin 43. The webs 32 have the straight edges 44 that engage the flat surface of the segments 42 whereby the rotative thrust of the brake shoes is accepted by the anchor pins 43 through the independently acting webs 32 positioned at each end of the anchor pin 43.

The opposite ends of the webs 32 are engaged by separate force applying devices which in this instance comprise hydraulic wheel cylinders 50 and 51 connected with a hydraulic brake system on the vehicle in conventional manner.

Each of the wheel cylinders 50 and 51 contain a pair of oppositely acting pistons 55 and 56 the space 57 between which receives hydraulic fluid to effect outward movement of the pistons and thereby produces a brake applying force on the webs 32 of the brake shoes. One of the pistons 56 is connected with the brake shoes 30 and 30a by means of a brake shoe adjusting device 58 while the opposite piston 55 is connected with the thrust end 60 of the respective brake shoes 30 and 30a.

It will be apparent that delivery of hydraulic fluid under pressure between the pistons 55 and 56 of the wheel cylinders 50 and 51 will effect movement of the brake shoes 30 and 30a through their connections 58, the anchor pins 43 accepting the longitudinal thrust of the brake shoes.

Figure 3:
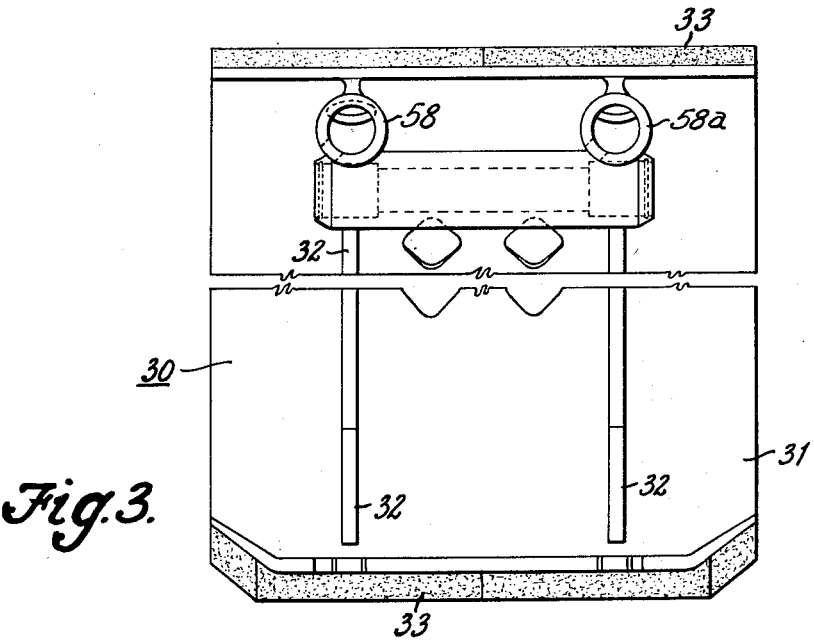
Figure 3 is an elevational view of a brake shoe incorporating features of this invention.

Each of the wheel cylinders 50 and 51 is connected independently to the respective webs 32 of the brake shoes through the independent connections 58 and 58a, as shown in Figure 3. While the wheel cylinders 50 and 51 are secured to the brake spider 25 by means of the bolts 65, and are stationary with the brake spider, each of the plungers 66 of the respective wheel cylinders act independently through the respective adjusting devices 58 and 58a to independently apply brake force to the respective independently acting webs 32 of the brake shoe.

Figure 2:
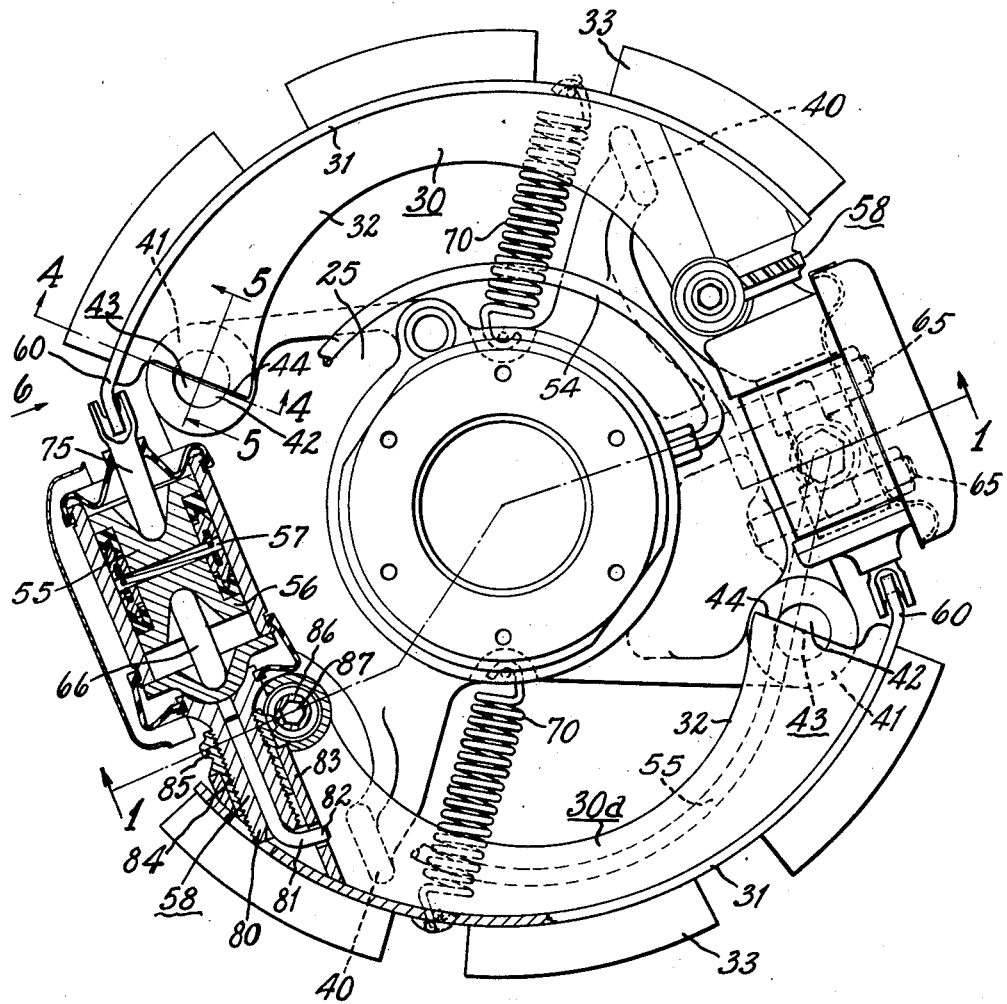
Figure 2 is an end elevational view of the brake structure illustrated in Figure 1 with certain parts thereof placed in cross section.

As shown in Figure 2, the anchor pins 43 are disposed substantially 180° opposite one another in the brake shoe with each brake shoe 30 and 30a being actuated independently by a pair of cooperating brake cylinders 50 and 51. Thus, each pair of brake cylinders for each of the brake shoes 30 and 30a respectively work independently one of the other and each of the brake cylinders of each pair of cylinders works independently of the other. Thus, in the two brake shoes 30 and 30a each containing a pair of force applying webs 32 the four force applying webs are each operated independently one of the other by an independently operating hydraulically actuated wheel cylinder with all functioning simultaneously as supplied with hydraulic fluid from the supply line 52 extending through the axle housing 16 with the pipe line 54 supplying fluid to one pair of wheel cylinders and the pipe line 55 supplying the second pair of wheel cylinders.

The retraction springs 70 are provided between the brake spider 25 and the brake shoes 30 and 30a to retain the shoes in normal retracted position.

During a brake application that is when the wheel cylinders are applying brake force to the webs 32, the connection of the plungers 75 with the thrust ends 60 of the brake shoes will effect a radial movement of the webs 32 relative to the anchor pins 43. With both ends of the brake shoes being thus free to move relative to the brake drum, self-centering of the brake shoes relative to the drum occurs.

With the ends of the webs 32 of the brake shoes being independently connected with the anchor pins 43, and with the opposite ends of the webs being independently connected with independently operating force applying devices, the brake force acting through the webs 32 is applied along lines longitudinal of the web with the force of the web being distributed transversely uniformly outward on both sides of the web. Since the area of influence of each web is substantially equivalent to the area of influence of every other web on the same shoe there will be a uniform distribution of brake force between the several webs to obtain a more uniform overall brake application between the brake lining and the brake drum.

Since the sheet metal rim 31 of the brake shoes is somewhat deformable transversely of the rim the application of the braking force to the rim in the manner described herein will cause the friction lining carried by the rim to more uniformly conform to the contour of the brake drum and thereby secure a more uniform application of brake pressure over the entire lining area. This is particularly important at times when the brake drum is hot and is expanding, the tendency being for the brake drum to bell-mouth toward the open end of the brake drum which normally results in a lesser degree of brake application of the lining at the open end than at the closed end. Since the brake shoe of this invention is somewhat deformable transversely of the shoe and since independent areas of influence are acted upon by the respective webs, the webs can slightly deform the rim of the brake shoe to cause it to conform to the deformation of the brake drum.

Each of the adjusting devices 58 includes a threaded neck portion 80 that has a square stem 81 positioned therein to prevent rotation of the member 80, the stem having an end 82 that projects through the boss 83 secured to the web and rim of the respective shoes 30 and 30a.

A threaded nut 84 has a worm wheel 85 engaged by a worm 86 on a cross shaft 87. Rotation of the cross shaft 87 rotates the nut 84 on the stem 80 to adjust the brake shoe 30 or 30a relative to the brake drum. As shown in Figure 1 each of the wheel cylinders 50 and 51 includes one of the adjusting devices 58 or 58a, both being of identical construction. The cross shaft 87 simultaneously adjusts both devices 58 and 58a to maintain the same mechanical position of each part of the shoe 30 or 30a as engaged by the respective devices 58 or 58a with the independent webs 32.

While the form of embodiment of the invention as herein disclosed constitutes a preferred form, it is to be understood that other forms might be adopted as may come within the scope of the claims which follow.

What is claimed is as follows:

1. In a vehicle brake structure, a brake drum, a brake shoe including a friction lining engageable with said drum, said shoe comprising an arcuate rim having a plurality of separate longitudinally extending force applying webs on the interior side of the rim spaced a substantial distance from one another and from the edges of the rim, each of said webs independently engaging anchor pin means at one end thereof and independently engaging independent force applying means at the other end thereof to apply braking force to the rim longitudinally along the webs independently.

2. In a vehicle brake structure, a brake drum, a brake shoe including a friction lining engageable with said drum, said shoe comprising a one piece non-rigid arcuate rim having a plurality of separate longitudinally extending parallel force applying webs on the interior side of the rim spaced a substantial distance from one another and from the edges of the rim, each of said webs independently engaging anchor pin means at one end thereof and independently engaging independent force applying means at the other end thereof to apply braking force to the rim longitudinally along the webs independently.

3. A vehicle brake structure in accordance with claim 2 in which the webs are spaced one from the other to divide the rim transversely dimensionally equidistantly at each of opposite sides of the webs.

4. A vehicle brake structure in accordance with claim 2 in which the webs are spaced from one another to divide the rim longitudinally with equal lining area extending transversely of each side of each of the webs, the lining areas of each of the webs being acted on separately by the independent webs, each web extending longitudinally of the rim centrally between opposite edges of its cooperating lining area.

5. In a vehicle brake structure, a brake drum, a brake shoe including a friction lining engageable with said drum, said shoe comprising a one piece non-rigid arcuate metal sheet rim of substantially uniform thickness having a plurality of separate longitudinally extending parallel metal sheet force applying webs of substantially uniform thickness bonded to the interior side of the rim, said webs being spaced from one another to divide the rim longitudinally with equal lining area extending transversely of each side of the webs, the lining areas of each of the webs being acted on separately by the independent webs, each web extending longitudinally of the rim centrally between opposite edges of its cooperating lining area, each of said webs independently engaging anchor pin means at one end thereof and independently engaging independent force applying means at the other end thereof to apply braking force to the rim through the webs independently with each web effecting brake pressure on its area of influence independently of the other of the webs.

6. A vehicle brake structure in accordance with claim 5 in which the webs comprise a pair of webs each of which is positioned midway between the longitudinal center line of the rim and an edge thereof.

7. A vehicle brake structure in accordance with claim 5 in which the friction lining extends equidistantly transversely of the rim on opposite sides of each of the webs with a line of severance extending longitudinally of the lining substantially coincidental with the center line of the rim.

8. In a vehicle brake structure, the combination of, a brake drum, a cooperating pair of brake shoes each including friction lining engageable with said drum, each of said shoes comprising a one piece non-rigid arcuate rim having a plurality of force applying separate longitudinally extending webs on the interior side of the rim spaced a substantial distance from one another and from the edges of the rim to divide the rim into areas of influence equally divided between each of the webs, corresponding thrust ends of said shoes each having the said separate webs thereof separately engaging anchor pin means, and separate force applying means separately engaging the opposite ends of the said webs of the respective shoes to apply brake force independently through the webs to the rim areas influenced separately thereby to secure uniform brake load application transversely of the rim.

9. A vehicle brake structure in accordance with claim 8 in which the webs are placed midway between the edges of the rim and the longitudinal center line thereof.

10. A vehicle brake structure in accordance with claim 8 wherein the rim comprises a metal sheet of substantially uniform thickness and the webs are formed from metal sheets of substantially uniform thickness with the webs disposed substantially normal to the rim and bonded thereto.

11. A vehicle brake structure in accordance with claim 8 wherein the rim comprises a metal sheet of substantially uniform thickness and the webs are formed from metal sheets of substantially uniform thickness with the webs disposed substantially normal to the rim and bonded thereto with each of the webs being positioned midway between the longitudinal center line of the rim and opposite edges thereof.

12. In a vehicle brake structure, the combination of, a brake drum, a cooperating pair of brake shoes each including friction lining engageable with said drum, each of said shoes comprising a one-piece non-rigid arcuate rim having a plurality of force applying separate longitudinally extending webs on the interior side of the rim spaced a substantial distance from one another and from the edges of the rim to divide the rim into areas of influence equally divided between each of the webs, corresponding thrust ends of said shoes each having the said separate webs thereof separately engaging anchor pin means, said anchor pin means for the respective shoes being disposed substantially 180° opposite one another, said webs engaging the anchor pin means for radial movement thereof relative to the anchor pin means, and separate force applying means separately engaging the opposite ends of the said webs of the respective shoes and positioned between the said opposite ends of the said webs and the thrust ends of said shoes to apply brake force independently through the said webs to the rim areas influenced separately thereby to secure uniform brake load application transversely of the rim and effect centralizing of said shoes relative to said drum by movement of said webs radially of said anchor pin means.

13. A vehicle brake structure in accordance with claim 12 in which the rim comprises a metal sheet of substantially uniform thickness and the webs are disposed substantially normal to the rim with the webs positioned substantially midway between the longitudinal center line of the rim and an edge thereof.

14. A vehicle brake structure in accordance with claim 12 in which the rim comprises a metal sheet of substantially uniform thickness and the webs are disposed substantially normal to the rim with the webs positioned substantially midway between the longitudinal center line of the rim and an edge thereof and wherein the friction lining extends equidistantly transversely of the rim on opposite sides of the respective webs with a severance line longitudinally thereof substantially coincidental with the longitudinal center line of the rim.

References Cited in the file of this patent

UNITED STATES PATENTS

| | | |
|---|---|---|
| 2,197,452 | Fussel | Apr. 16, 1940 |
| 2,372,319 | François | Mar. 27, 1945 |
| 2,385,540 | Rasmussen | Sept. 25, 1945 |
| 2,496,562 | Schnell | Feb. 7, 1950 |

FOREIGN PATENTS

| | | |
|---|---|---|
| 518,927 | Great Britain | Mar. 12, 1940 |
| 532,295 | Great Britain | Jan. 21, 1941 |